United States Patent
Brach et al.

(10) Patent No.: US 11,901,783 B2
(45) Date of Patent: Feb. 13, 2024

(54) METHOD FOR PRODUCING A WINDING OVERHANG ASSEMBLY FOR AN ELECTRICAL ROTATING MACHINE

(71) Applicant: Innomotics GmbH, Nuremberg (DE)

(72) Inventors: Karsten Brach, Berlin (DE); Jens Dahl Jensen, Berlin (DE); Horst Kümmlee, Berlin (DE); Hartmut Rauch, Berlin (DE); Olaf Rehme, Hamburg (DE); Jakob Schneck, Berlin (DE); Frank Seibicke, Borkheide (DE); Oliver Stier, Berlin (DE); Mark Tobias Zegenhagen, Berlin (DE)

(73) Assignee: Innomotics GmbH, Nuremberg (DE)

( * ) Notice: Subject to any disclaimer, the term of this patent is extended or adjusted under 35 U.S.C. 154(b) by 435 days.

(21) Appl. No.: 17/278,148

(22) PCT Filed: Sep. 16, 2019

(86) PCT No.: PCT/EP2019/074645
§ 371 (c)(1),
(2) Date: Mar. 19, 2021

(87) PCT Pub. No.: WO2020/058164
PCT Pub. Date: Mar. 26, 2020

(65) Prior Publication Data
US 2021/0376679 A1 Dec. 2, 2021

(30) Foreign Application Priority Data
Sep. 21, 2018 (EP) .................................. 18195858

(51) Int. Cl.
*H02K 3/28* (2006.01)
*H02K 1/16* (2006.01)
(Continued)

(52) U.S. Cl.
CPC ............... *H02K 3/28* (2013.01); *H02K 1/16* (2013.01); *H02K 3/24* (2013.01); *H02K 3/34* (2013.01);
(Continued)

(58) Field of Classification Search
CPC .. H02K 3/28; H02K 1/16; H02K 3/24; H02K 3/34; H02K 3/48; H02K 15/0081; H02K 15/105
See application file for complete search history.

(56) References Cited

U.S. PATENT DOCUMENTS

| 5,185,918 A | 2/1993 | Shafer, Jr. |
| 2004/0104212 A1 | 6/2004 | Gadow et al. |

(Continued)

FOREIGN PATENT DOCUMENTS

| CN | 1494816 A | 5/2004 |
| CN | 101651378 A | 2/2010 |

(Continued)

OTHER PUBLICATIONS

PCT International Examination Report and Written Opinion of International Examination Authority dated Jan. 9. 2020 corresponding to PCT International Application No. PCT/EP2019/074645 filed Sep. 16, 2019.

(Continued)

*Primary Examiner* — Thomas Truong
(74) *Attorney, Agent, or Firm* — Henry M. Feiereisen LLC

(57) ABSTRACT

In a method for producing a winding overhang assembly for an electrical rotating machine, an insulating main body is produced at least partly from a dielectric material. Each of a plurality of conductors of a metal material is connected to the insulating main body via an intermediate layer, which is produced from a material which is different from the dielec- (Continued)

tric material of the insulating main body and from the metal material of the conductors and which is produced from silver, aluminum, antimony, magnesium, tin, zinc, lead, tantalum or from a mixture and/or from at least one alloy thereof. The conductors are hereby sprayed onto the intermediate layer by a thermal spraying method.

20 Claims, 5 Drawing Sheets

(51) Int. Cl.
    *H02K 3/24*           (2006.01)
    *H02K 3/34*           (2006.01)
    *H02K 3/48*           (2006.01)
    *H02K 15/00*         (2006.01)
    *H02K 15/10*         (2006.01)

(52) U.S. Cl.
    CPC ........... *H02K 3/48* (2013.01); *H02K 15/0081* (2013.01); *H02K 15/105* (2013.01)

(56) References Cited

U.S. PATENT DOCUMENTS

| | | |
|---|---|---|
| 2006/0044734 A1 | 3/2006 | Ahn et al. |
| 2006/0202584 A1 | 9/2006 | Jore |
| 2008/0231136 A1* | 9/2008 | Obata .................... H02K 3/38 |
| | | 310/179 |
| 2010/0038988 A1 | 2/2010 | Ramy et al. |
| 2013/0033135 A1 | 2/2013 | Yamaguchi |
| 2013/0076175 A1 | 3/2013 | Turnbull et al. |
| 2014/0319960 A1 | 10/2014 | Iki |
| 2015/0076951 A1 | 3/2015 | Lynch et al. |
| 2019/0229594 A1 | 7/2019 | Kuemmlee |
| 2020/0204029 A1* | 6/2020 | Ishikawa ................ H02K 3/345 |

FOREIGN PATENT DOCUMENTS

| | | |
|---|---|---|
| CN | 102916515 A | 2/2013 |
| CN | 103023170 A | 4/2013 |
| DE | 102009032882 B3 | 11/2010 |
| EP | 1777797 A2 | 4/2007 |
| EP | 1742330 B1 | 9/2009 |
| EP | 3297131 A1 | 3/2018 |
| EP | 3364524 A1 | 8/2018 |
| RU | 2294588 C2 | 2/2007 |
| SU | 132307 A1 | 11/1960 |
| WO | WO 2016143008 A1 | 9/2016 |
| WO | WO 2018050331 A1 | 3/2018 |

OTHER PUBLICATIONS

Wikipedia, title: "3D-Druck", Internet link: https ://de.wikipedia.org/w/index.php?title=3D-Druck&oldid=181069716, printed on Nov. 21, 2018, pp. 1 to 9.

* cited by examiner

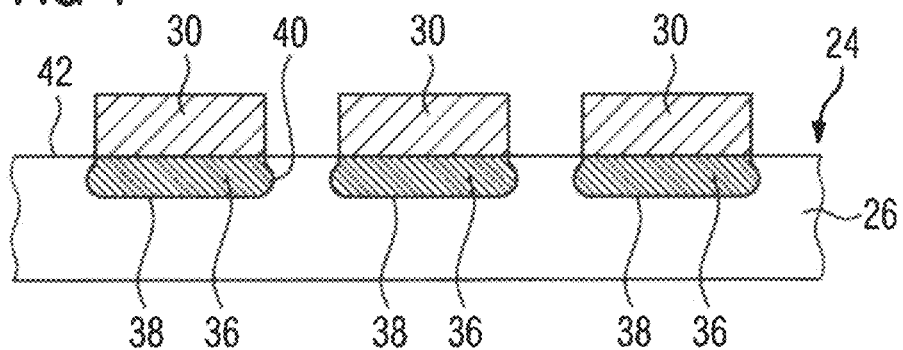
FIG 4
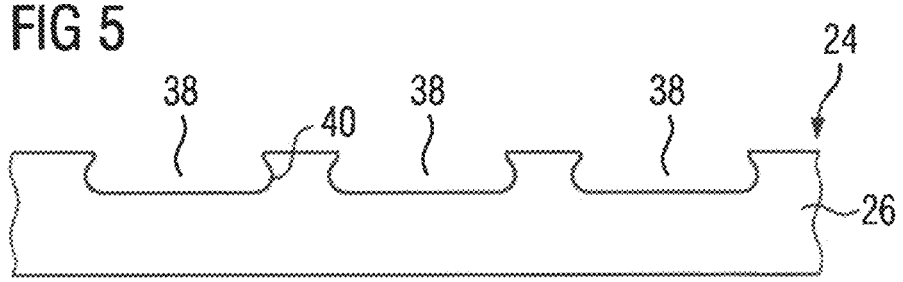
FIG 5
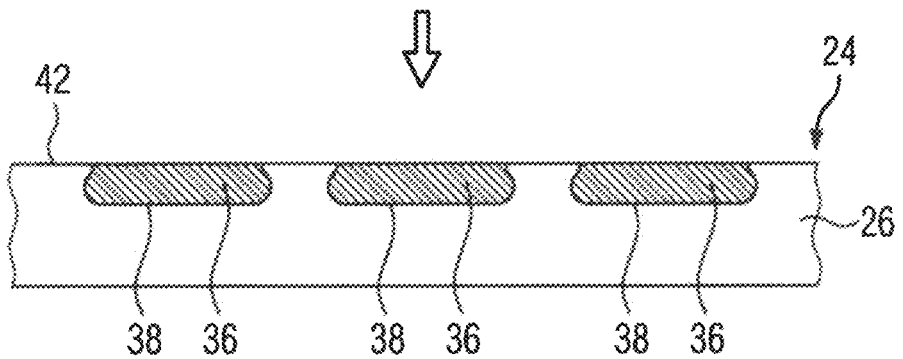
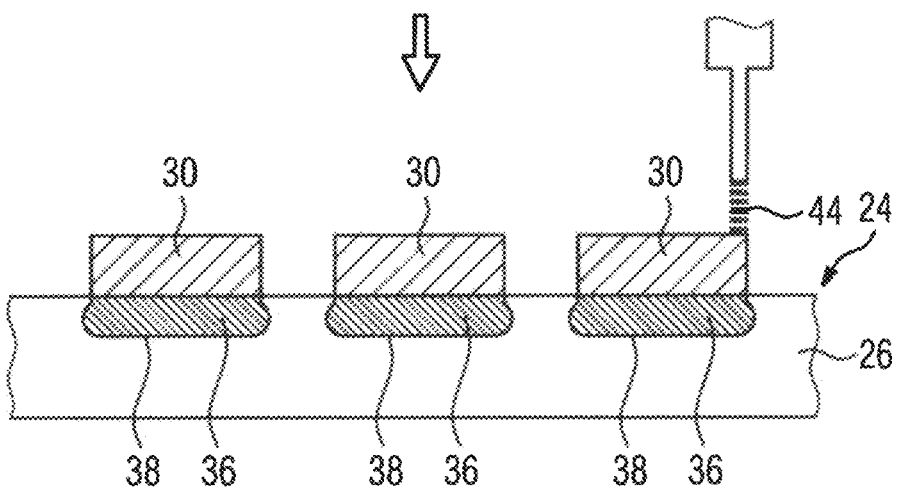

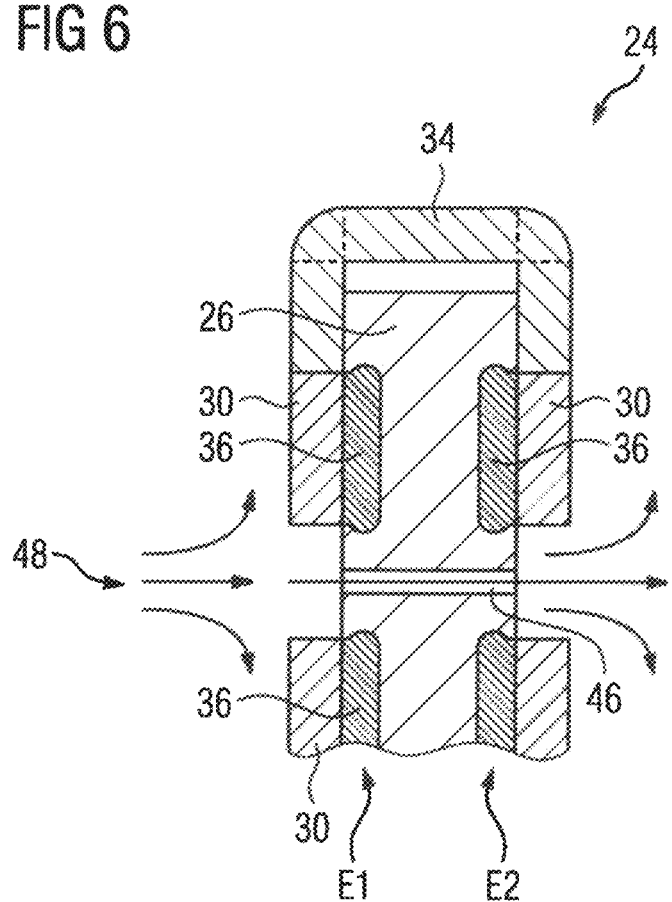

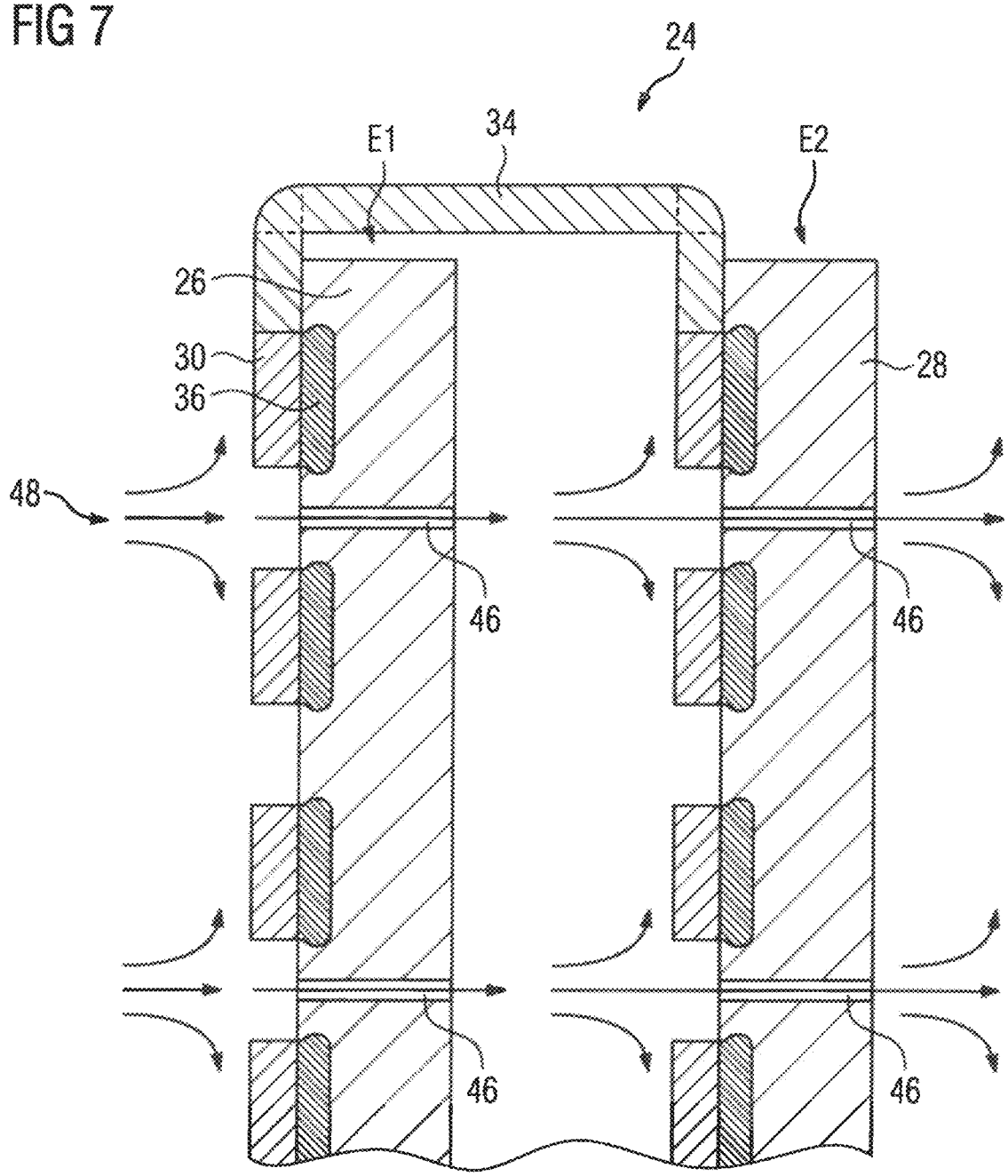

METHOD FOR PRODUCING A WINDING OVERHANG ASSEMBLY FOR AN ELECTRICAL ROTATING MACHINE

This application is the U.S. National Stage of international Application No. PCT/EP2019/074645, filed Sep. 16, 2019, which designated the United States and has been published as international Publication No, WO 2020/058164 A1 and which claims the priority of European Patent Application, Serial No. 18195858.8, filed Sep. 21, 2018, pursuant to 35 U.S.C. 119(a)-(d).

BACKGROUND OF THE INVENTION

The invention relates to a method for producing a winding overhang assembly for an electrical rotating machine.

The invention further relates to a winding overhang assembly for an electrical rotating machine which is produced according to such a method.

Furthermore, the invention relates to a stator for an electrical rotating machine which has a magnetic field-guiding stator element and at least one such winding overhang assembly.

The invention moreover relates to an electrical rotating machine with at least one such stator.

Usually, the stator windings of such an electrical rotating machine, which can be operated with an output of at least one megawatt, are designed as preformed coils. Preformed coils are produced, for example, by means of drawing, casting or powder metallurgy. At the ends of the preformed coils there is a winding overhang which is produced by bending and offsetting the conductors of the preformed coils. This winding overhang requires a considerable amount of axial installation space. The additional inactive conductor length of the winding overhang results in ohmic losses which reduce the efficiency of the electrical rotating machine. Furthermore, it is necessary to cool the winding overhangs. Additional installation space is required for cooling.

In particular, in the case of high-speed, low-pole machines, the increased bearing spacing caused by the winding overhangs has a disadvantageous effect on the rotor dynamics. Furthermore, additional complex stiffening measures are required due to the large conductor lengths in order to prevent inadmissible oscillations and deformations during operation. Furthermore, the overall length and the weight of the electrical rotating machine increase. In particular, in the case of a modular construction of large machines, in which a plurality of partial machines form an overall machine in the axial direction, considerable electrically unused lengths are produced on account of the winding overhangs.

The winding overhangs of the preformed coils are manufactured semi-automatically with great effort, for example by bending copper conductors in such a way that they can be placed in the grooves in a fitting manner. A subsequent connection of the respective copper conductors, insulation of the connecting points and stiffening of the copper conductors against each other takes place manually with great effort. In principle, it is only possible with great effort, for example using different conductor lengths which are connected by soldering, to realize different conductor geometries in the grooves and in the winding overhangs.

In the case of tooth-coil windings, in particular in a flat-wire design, the distance between adjacent grooves can only be as small as the insulated copper conductor bending radius which is to be maintained permits.

The patent specification DE 10 2009 032 882 B3 describes a method for producing a preformed coil for a stack winding of a dynamoelectric machine and a preformed coil produced by means of said method. In order to simplify the production of the preformed coil, the latter is produced from a raw coil, the raw coil having two longitudinal sides which are provided for insertion into grooves of a stator or a rotor of the dynamoelectric machine. The raw coil has two winding overhang sides which are provided to form a respective winding overhang of the preformed coil, the longitudinal sides being bent by 90° in such a way as to insert the longitudinal sides into the grooves and to offset the winding overhang sides from the longitudinal sides.

The patent specification EP 1 742 330 B1 describes a stator winding overhang for a stator part of a turbo generator. The stator winding overhang is in the form of a disk with a central recess for feedthrough of a rotor, the disk having an insulating main body into which an electrical connection for contacting a stator conductor is integrated. The contact is produced in the form of a plug connection and/or with through connections.

The patent application EP 3 297 131 A1 describes a stator for an electrical rotating machine which has a laminated stator core with coil rods and at least one stator winding overhang plate with an insulating main body. In order to reduce the axial length of the stator, it is proposed that conductor tracks be integrated into the insulating main body, the at least one stator winding overhang plate resting on an end face of the laminated stator core and the conductor tracks being integrally connected to the coil rods.

The patent application EP 3 364 524 A1 describes a stator for an electrical rotating machine which has a laminated stator core with coil rods and at least one winding overhang plate, the at least one winding overhang plate resting on an end face of the laminated stator core, the winding overhang plate having a main body with a first dielectric material, conductor tracks connected to the coil rods being integrated into the winding overhang plate, the winding overhang plate having an area with a second dielectric material and/or an area with a third dielectric material, and the second dielectric material and/or the third dielectric material in each case having higher thermal conductivity and/or higher dielelectric strength than the first dielectric material.

The object of the invention is to specify a method for producing a winding overhang assembly for an electrical rotating machine which, in comparison with the prior art, is simpler and more economical.

SUMMARY OF THE INVENTION

The object is achieved according to the invention by a method for producing a winding overhang assembly for an electrical rotating machine having at least one insulating main body, which is produced at least partly from a dielectric material, a plurality of conductors made of a metal material being connected to the insulating main body by means of at least one intermediate layer each, the intermediate layer being produced from a material different from the dielectric material and from the metal material, the conductors being sprayed onto the intermediate layer by means of a first thermal spraying method, in particular by means of cold gas spraying, and the intermediate layer being produced from silver, aluminum, antimony, magnesium, tin, zinc, lead, tantalum or from a mixture and/or from at least one alloy thereof.

Furthermore, the object is achieved according to the invention by a winding overhang assembly for an electrical rotating machine which is produced according to such a method, the winding overhang assembly having at least one insulating main body which is produced at least partly from a dielectric material, a plurality of conductors made of a metal material being connected to the insulating main body by means of at least one intermediate layer each, the intermediate layer being produced from a material different from the dielectric material and from the metal material, the conductors being sprayed onto the intermediate layer by means of a first thermal spraying method, the intermediate layer being produced from silver, aluminum, antimony, magnesium, tin, zinc, lead, tantalum or from a mixture and/or from at least one alloy thereof.

Furthermore, the object is achieved according to the invention by a stator for an electrical rotating machine, which stator has a magnetic field-guiding stator element and at least one such winding overhang assembly.

In addition, the object is achieved according to the invention by an electrical rotating machine having at least one such stator.

The advantages and preferred embodiments listed below with regard to the method can be applied analogously to the winding overhang assembly, the stator, and the electrical rotating machine.

The aim of the invention is to optimize the production of a winding overhang assembly by using a thermal spraying method, in that conductors of the winding overhang assembly are produced by spraying metallic solid particles, so-called spray particles, onto an insulating main body via an intermediate layer. A dense and firmly adhering layer is formed by spraying the spray particles. Thermal spraying processes include, for example, arc spraying, plasma spraying, flame spraying or cold gas spraying. The spray particles contain copper, for example, while the insulating main body is produced from a dielectric material, for example made of a plastic or a ceramic material. Alternatively, the insulating main body has a base plate, for example an electrically conductive base plate, which, at least in the area of the conductors, is coated with an insulating layer made of a dielectric material, for example made of a plastic or a ceramic material.

Nevertheless, in order to avoid damage to the insulating main body, an intermediate layer made of a material which differs from the dielectric material and from the metal material is arranged thereon, onto which the spray particles are sprayed. The intermediate layer is connected to the dielectric material of the insulating main body and is produced, for example, from silver (Ag), aluminum, antimony, magnesium, tin, zinc, lead, tantalum or from a mixture and/or from at least one alloy thereof. In comparison with other additive manufacturing processes, thick layers, for example in the millimeter range and in the centimeter range, can be produced in a short time and in a geometrically very flexible manner with the aid of a thermal spraying method. A thermal spraying method thus makes the production process simpler and more economical.

In a preferred embodiment, the conductors are sprayed onto the intermediate layer by means of cold gas spraying. Cold gas spraying is a thermal spraying method in which the spray particles are accelerated to such a high speed that, in contrast to other thermal spraying methods, they form a dense and firmly adhering layer upon impact with the substrate, even without preceding fusing or melting. As the material applied by means of cold gas spraying is not melted but deformed by its kinetic energy, the intermediate layer and the dielectric main body are only exposed to very low temperature loads in comparison with other thermal spraying methods.

In a preferred embodiment, the intermediate layer is connected to the insulating main body by means of at least one positive connection. The winding overhang assembly is protected from, for example, thermal and/or mechanical, external influences by means of an, in particular additional, positive connection.

In a further advantageous embodiment, the intermediate layer is sprayed onto the insulating main body by means of a second thermal spraying method, in particular by means of cold gas spraying, the second thermal spraying method being different from the first thermal spraying method. While the metal material of the conductors has the highest possible electrical conductivity, the material of the intermediate layer is suitable for creating a mechanically and thermally stable connection between the dielectric main body and the respective conductors. In particular, the second thermal spraying method is then optimized to gently apply the intermediate layer to the dielectric main body. Furthermore, the intermediate layer is sprayed using a thermal spraying method in order to achieve a consistent and uniform production method.

In a further advantageous embodiment, the second thermal spraying method differs from the first thermal spraying method with regard to the speed and/or size of the particles. For example, when using a soft material like tin, a lower kinetic energy is required in order for the solid particles to form a dense, firmly adhering layer upon impact. As a result, damage to the dielectric main body is avoided.

The intermediate layer is particularly advantageously arranged at least partly in grooves of the insulating main body. As a result of an arrangement in grooves the intermediate layer is resilient to external influences.

In a further advantageous embodiment, the grooves of the insulating main body have a profile by means of which the positive connection is produced. For example, the profile is designed in the shape of a dovetail or hammer head. The positive connection is stabilized by the profile.

In an advantageous embodiment, electrical insulation is applied in a further step. By means of electrical insulation, for example, short circuits between the conductors are prevented.

Cooling channels are particularly advantageously arranged in the insulating main body. A cooling fluid flows through the cooling channels for cooling during operation, said cooling fluid dissipating the heat generated in the conductors. In particular, when using an insulating main body with low thermal conductivity, it is necessary to cool the conductors via cooling channels.

In a further advantageous embodiment, the conductors are arranged in at least two planes, in particular one behind the other in the axial direction. The space required for the winding overhang assembly is reduced by means of an arrangement in planes.

The conductors of the at least two planes are particularly advantageously connected to one another via connecting elements. A connecting element is, for example, a conductor element, which is non-detachably connected to a conductor of the first plane and a conductor of the second plane. As a result of such a connecting element, the winding overhang assembly is stable even under very high mechanical and/or thermal stress.

In a further advantageous embodiment, a dielectric material with a dielectric strength of at least 10 kV/mm is used. Such dielectric materials include, for example, thermoplastic plastics such as Plexiglas and PVC, glass-fiber-reinforced epoxy resins, which optionally contain mica, or ceramic materials such as aluminum oxide. By means of a material with such a high dielectric strength, it is possible to reduce the distance between the conductors and to reduce the space requirement of the winding overhang assembly.

A metal material which has a higher electrical conductivity and/or a higher strength than the material of the intermediate layer is particularly advantageously used. For example, copper or a copper alloy is used as the metal material, while the intermediate layer contains tin, for example. Such materials make it possible to produce a winding overhang assembly with a high current carrying capacity and high mechanical stability in a simple and economical manner.

BRIEF DESCRIPTION OF THE DRAWING

The invention is described and explained in more detail hereinafter with reference to the exemplary embodiments shown in the figures.

The figures show.

DETAILED DESCRIPTION OF PREFERRED EMBODIMENTS

Figure 1:
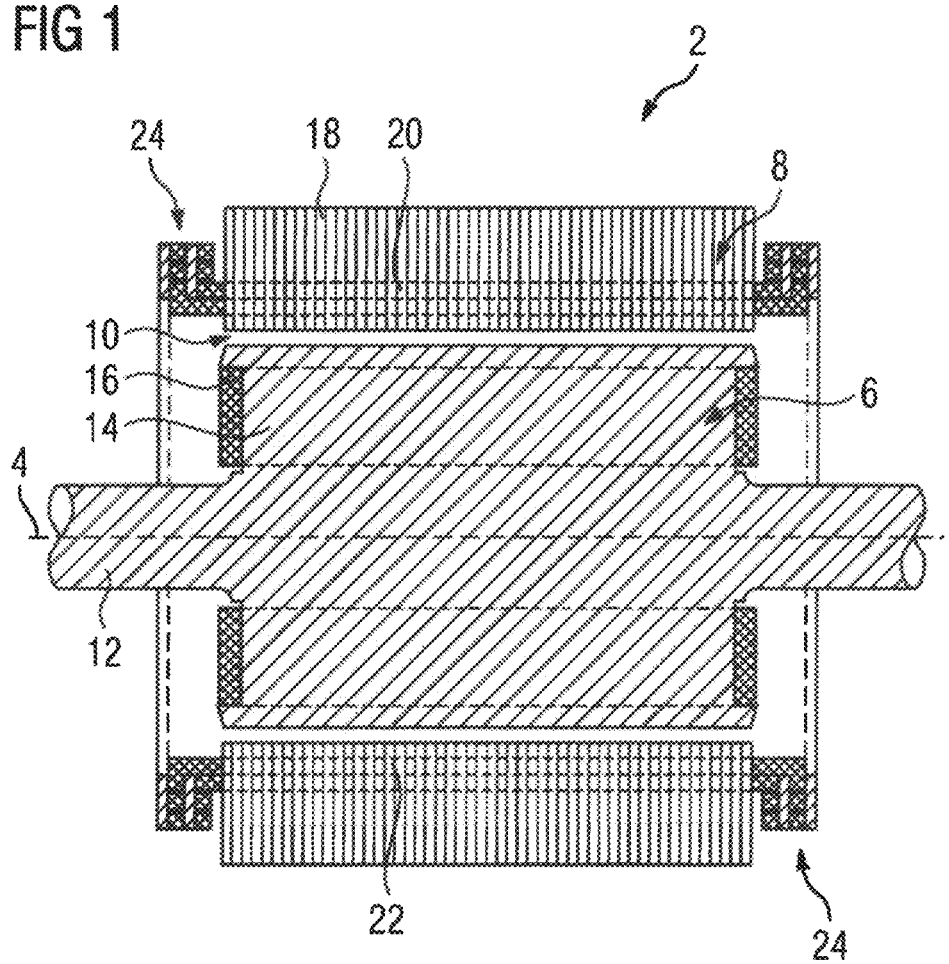
FIG. 1 A longitudinal section of an electrical rotating machine.

The exemplary embodiments explained hereinafter are preferred embodiments of the invention. In the exemplary embodiments, the described components of the embodiments each represent individual features of the invention which are to be considered independently of one another, which also develop the invention independently of one another and are therefore also to be regarded as part of the invention individually or in a combination other than the combination shown. Furthermore, the described embodiments can also be supplemented by further features of the invention already described.

The same reference characters have the same meaning in the various figures.

FIG. 1 shows a longitudinal section of an electrical rotating machine 2 which is designed as a synchronous machine by way of example. The synchronous machine has a rotor 6 which can be rotated about a rotation axis 4 and is designed as a salient pole rotor by way of example, and a stator 8 surrounding the rotor 6. Between the rotor 6 and the stator 8 there is a gap 10, which is designed in particular as an air gap. The rotation axis 4 defines an axial direction, a radial direction, and a circumferential direction. The rotor 6 comprises a shaft 12 and salient poles 14 with an excitation winding 16. Alternatively, the rotor 6 has permanent magnets or a squirrel cage.

The stator 8 comprises a magnetic field-guiding, in particular eddy current-suppressing, stator element 18 which is designed, for example, as a laminated core, and a stator winding 20. The stator winding 20 comprises coil rods 22 which are produced, for example, from copper and run in the axial direction through the magnetic field-guiding stator element 18. The axial ends of the coil rods 22 are each connected to a winding overhang assembly 24. Connections of the stator winding 20, for example to a terminal box, are not shown for reasons of clarity.

Figure 2:
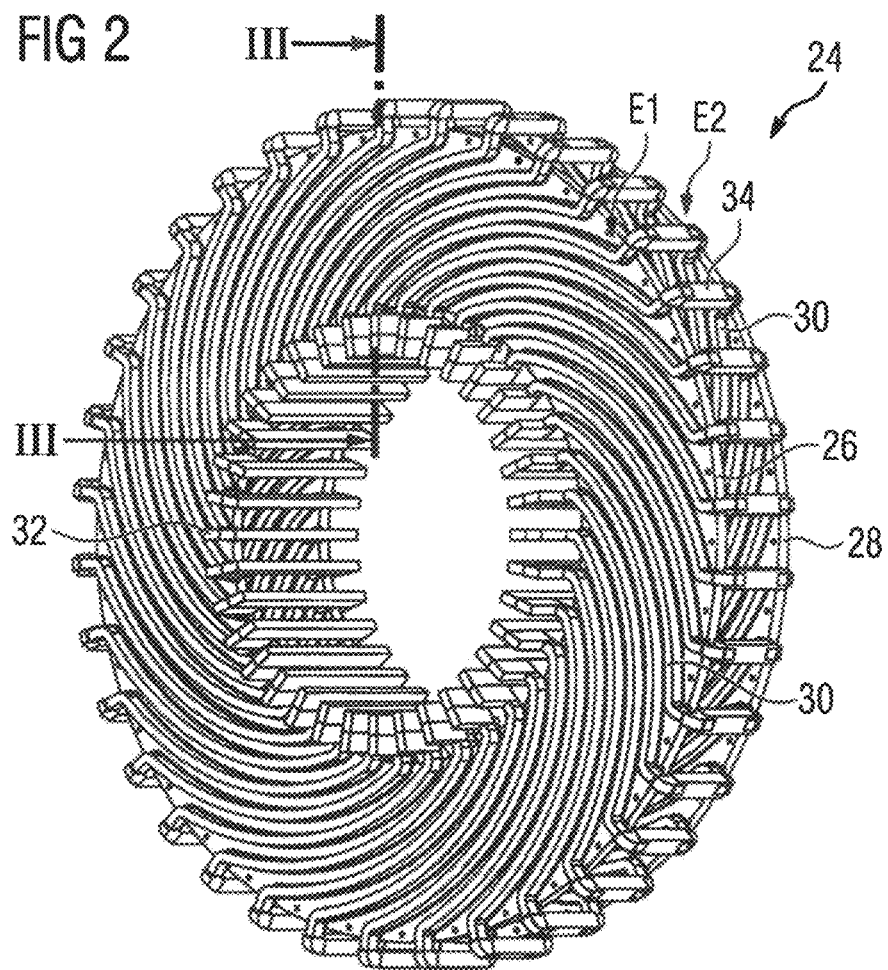
FIG. 2 A three-dimensional representation of a winding overhang assembly for an electrical rotating machine, FIG. 3 An enlarged cross-section of a first embodiment of a winding overhang assembly, FIG. 4 A cross-section of conductors of a winding overhang assembly, FIG. 5 A diagrammatic view of a method for producing a winding overhang assembly, FIG. 6 An enlarged cross-section of a second embodiment of a winding overhang assembly, FIG. 7 An enlarged cross-section of a third embodiment of a winding overhang assembly.

FIG. 2 shows a three-dimensional representation of a winding overhang assembly 24 for an electrical rotating machine 2. The winding overhang assembly 24 comprises, for example, two planes E1, E2 arranged one behind the other in the axial direction and each having an insulating main body 26, 28. The winding overhang assembly 24 is provided for a two-layer winding. The insulating main body 26, 28 essentially has a hollow cylindrical shape and is produced from a dielectric material, for example from a plastic or a ceramic material, with a dielectric strength of at least 10 kV/mm. Each plane is assigned a plurality of conductors 30, the conductors 30 being connected to the respective insulating main body 26, 28. The conductors 30 have, for example, a rectangular or square conductor cross-section and are produced from a metal material, in particular copper, with a conductivity of at least 50 MS/m. Metallic connecting sections 32 are arranged on the conductors 30 in order to establish a connection of the conductors 30 to the respective coil rods 22. Furthermore, the conductors 30 of the respective planes E1, E2 are connected via electrically conductive connecting elements 34. For example, the connecting elements 34 are produced from copper. The further embodiment of the winding overhang assembly 24 in FIG. 2 corresponds to that in FIG. 1.

Figure 3:
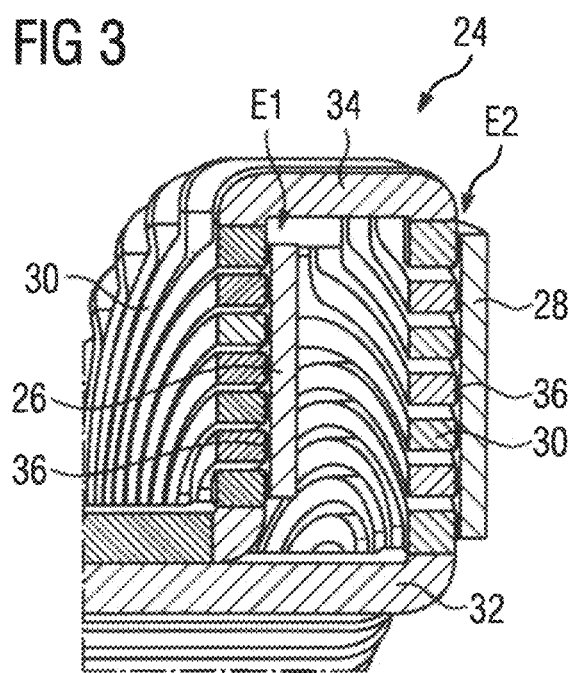

FIG. 3 shows an enlarged cross-section of a first embodiment of a winding overhang assembly 24. The conductors 30 are connected to the respective insulating main body 26, 28 by means of at least one intermediate layer 36 each, the intermediate layer 36 forming a conductor foundation and being connected to the respective insulating main body 26, 28 by means of a positive connection. The intermediate layer 36 is produced from a material which differs from the dielectric material of the respective insulating main body 26, 28 and from the metal material of the conductors 30. The intermediate layer 36 is produced, for example, from silver, aluminum, antimony, magnesium, tin, zinc, lead, tantalum or from a mixture and/or from at least one alloy thereof. Optionally, the intermediate layer 36 has additional fillers such as, for example, a ceramic material.

The conductors 30 are produced from electrically conductive solid particles which are sprayed on by means of a first thermal spraying method, in particular by means of cold gas spraying. The electrically conductive solid particles contain, for example, copper, wherein electrical conductivity of at least 50 MS/m is achieved by means of the first thermal spraying method.

The intermediate layer 36 is likewise produced from electrically conductive solid particles which are sprayed onto the insulating main body 26, 28 by means of a second thermal spraying method, in particular by means of cold gas spraying, wherein the second thermal spraying method differs from the first thermal spraying method. In particular, the second thermal spraying method differs from the first thermal spraying method with regard to the type of particles used, the speed of the particles and/or the size of the particles. Alternatively, the intermediate layer 36 is produced by means of another method, for example by means of casting or by means of a galvanic method. The further embodiment of the winding overhang assembly 24 in FIG. 3 corresponds to that in FIG. 2.

FIG. 4 shows a cross-section of conductors 30 of a winding overhang assembly 24, wherein the conductors 30 are each connected to an insulating main body 26 by means of an intermediate layer 36. The intermediate layer 36 is arranged in grooves 38 of the insulating main body 26 in each case. The grooves 38 have a profile 40 by means of which a positive connection is produced with the insulating main body 26. In particular, the groove 38 is profiled tapering toward the outside in order to ensure a positive connection between the respective intermediate layer 36 and the insulating main body 26. For example, the groove 38 is designed as a hammer head groove or as a dovetail groove. The further embodiment of the winding overhand assembly 24 in FIG. 4 corresponds to that in FIG. 3.

FIG. 5 shows a diagrammatic view of a method for producing a winding overhang assembly 24, an insulating main body 26 made of a dielectric material with grooves 38 first being provided. The grooves have a profile 40 by means of which a protrusion of the dielectric material of the insulating main body 26, for example in the area of an opening of the groove 38, is produced.

In a further step, an intermediate layer 36 which is essentially flush with a surface 42 of the insulating main body 26 is arranged in the grooves. The intermediate layer 36 is sprayed onto the insulating main body 26 by means of a second thermal spraying method, in particular by means of cold gas spraying. In order to homogeneously fill the groove 38 despite the profile 40, the particles of the second thermal spraying method are sprayed into the respective groove 38 from different directions. Alternatively, the intermediate layer 36 is introduced into the grooves 38 in a different manner, for example by means of casting or by means of a galvanic method.

In a further step, conductors 30 are sprayed onto the intermediate layer 36 by means of a first thermal spraying method, in particular by means of cold gas spraying. In particular, when particles of copper are used, which are sprayed onto the intermediate layer 36 by means of cold gas spraying, the intermediate layer 36 allows better adhesion and a greater particle density as the particles can be sprayed onto the intermediate layer 36 at a greater speed than onto the insulating main body 26. In addition to improved stability, the use of an intermediate layer 36 for the conductors 30 results in greater electrical conductivity. In a further step not shown in FIG. 5, electrical insulation is at least applied to the conductors 30. The further embodiment of the winding overhang assembly 24 in FIG. 5 corresponds to that in FIG. 4.

FIG. 6 shows an enlarged cross-section of a second embodiment of a winding overhang assembly 24. The conductors 30 are connected on both sides to an insulating main body 26 by means of an intermediate layer 36 each, wherein in each case one side of the insulating main body 26 forms a plane E1, E2 with the respective intermediate layers 36 and conductors 30 connected thereto. The conductors 30 of the planes E1, E2 are connected to one another by means of electrically conductive connecting elements 34 which are produced, for example, from copper. Furthermore, the winding overhang assembly 24 has at least one cooling channel 46 in order to cool the current-carrying conductors 30 of the winding overhang assembly 24 on both sides by means of a cooling fluid flow flowing through the at least one cooling channel 46. For example, the at least one cooling channel 46 is arranged in the axial direction. Additionally, or alternatively, the at least one cooling channel 46 is arranged at least partly in the radial direction. Air, process gas, water, oil, or other liquid and/or gaseous cooling media can be used as cooling fluid. The further embodiment of the winding overhang assembly 24 in FIG. 6 corresponds to that in FIG. 5.

FIG. 7 shows an enlarged cross-section of a third embodiment of a winding overhang assembly 24 comprising two planes E1, E2 arranged one behind the other in the axial direction with an insulating main body 26, 28 in each case. The insulating main bodies 26, 28 have cooling channels 46, at least one cooling channel 46 of the first insulating main body 26 being fluidically connected to at least one cooling channel 46 of the second insulating main body 28. The further embodiment of the winding overhang assembly 24 in FIG. 7 corresponds to that in FIG. 6.

In summary, the invention relates to a method for producing a winding overhang assembly 24 for an electrical rotating machine 2. In order to provide a winding overhang assembly 24 which, in comparison with the prior art, can be produced more simply and more economically, it is proposed that the winding overhang assembly 24 have at least one insulating main body 26, 28 which is produced at least partly from a dielectric material, a plurality of conductors 30 made of a metal material being connected to the insulating main body 26, 28 by means of at least one intermediate layer 36 each, the intermediate layer 36 being produced from a material different from the dielectric material and from the metal material, and the conductors 30 being sprayed onto the intermediate layer 36 by means of a first thermal spraying method.

What is claimed is:

1. A method for producing a winding overhang assembly for an electrical rotating machine, said method comprising:
   producing an insulating main body at least partly from a dielectric material;
   connecting each of a plurality of conductors of a metal material to the insulating main body via an intermediate layer;
   producing the intermediate layer from a material which is different from the dielectric material of the insulating main body and from the metal material of the conductors and which is produced from silver, aluminum, antimony, magnesium, tin, zinc, lead, tantalum or from a mixture and/or from at least one alloy thereof; and
   spraying the conductors onto the intermediate layer by a first thermal spraying method.

2. The method of claim 1, wherein the conductors are sprayed onto the intermediate layer by cod gas spraying as the first thermal spraying method.

3. The method of claim 1, wherein the intermediate layer is connected to the insulating main body by a positive connection.

4. The method of claim 1, wherein the intermediate layer is sprayed onto the insulating main body by a second thermal spraying method, in particular by means of cold gas spraying, with the second thermal spraying method differing from the first thermal spraying method.

5. The method of claim 4, wherein the second thermal spraying method differs from the first thermal spraying method with regard to speed and/or size of particles used in the first and second thermal spraying methods.

6. The method of claim 1, further comprising arranging the intermediate layer at least partly in grooves of the insulating main body.

7. The method of claim 6, wherein the grooves of the insulating main body have a profile to effect a positive connection between the intermediate layer and the insulating main body.

8. The method of claim 1, further comprising applying an electrical insulation onto the conductors to prevent short-circuiting of the conductors.

9. The method of claim 1, further comprising arranging cooling channels in the insulating main body.

10. The method of claim 1, further comprising arranging the conductors in at least two planes, in particular in at least two planes which are arranged behind one another in an axial direction.

11. The method of claim 10, further comprising connecting the conductors in the at least two planes to one another via connecting elements.

12. The method of claim 1, wherein the dielelectric material of the insulating main body has a dielelectric strength of at least 10 kV/mm.

13. The method of claim 1, wherein the metal material of the conductors has an electrical conductivity which is higher than an electrical conductivity of the material of the intermediate layer and/or the metal material of the conductors has a strength which is higher than a strength of the material of the intermediate layer.

14. A winding overhang assembly for an electrical rotating machine, comprising:
an insulating main body made at least partly from a dielectric material; and
a plurality of conductors made of a metal material and connected to the insulating main body via an intermediate layer from a material which differs from the dielectric material of the insulating main body and from the metal material of the conductors, with the conductors being sprayed onto the intermediate layer by a thermal spraying method, and with the intermediate layer being made from silver, aluminum, antimony, magnesium, tin, zinc, lead, tantalum or from a mixture and/or from at least one alloy thereof.

15. The winding overhang assembly of claim 14, wherein the intermediate layer is arranged at least partly in grooves of the insulating main body, said grooves of the insulating main body having a profile to effect a positive connection between the intermediate layer and the insulating main body.

16. The winding overhang assembly of claim 14, wherein the conductors are arranged in at least two planes, and, further comprising connecting elements configured to connect the conductors in the at least two planes to one another.

17. A stator for an electrical rotating machine, said stator comprising:
a magnetic field-guiding stator element; and
a winding overhang assembly arranged at an axial end of the magnetic field-guiding stator element, said winding overhang assembly comprising an insulating main body made at least partly from a dielectric material, and a plurality of conductors made of a metal material and connected to the insulating main body via an intermediate layer from a material which differs from the dielectric material of the insulating main body and from the metal material of the conductors, with the conductors being sprayed onto the intermediate layer by a thermal spraying method, and with the intermediate layer being made from silver, aluminum, antimony, magnesium, tin, zinc, lead, tantalum or from a mixture and/or from at least one alloy thereof.

18. The stator of claim 17, further comprising coil rods arranged at least partly in the magnetic field-guiding stator element and connected to the conductors of the winding overhang assembly.

19. The stator of claim 18, wherein the conductors are arranged essentially perpendicular to the coil rods.

20. An electrical rotating machine, comprising a stator as set forth in claim 17.

* * * * *

UNITED STATES PATENT AND TRADEMARK OFFICE
CERTIFICATE OF CORRECTION

| | |
|---|---|
| PATENT NO. | : 11,901,783 B2 |
| APPLICATION NO. | : 17/278148 |
| DATED | : February 13, 2024 |
| INVENTOR(S) | : Karsten Brach et al. |

It is certified that error appears in the above-identified patent and that said Letters Patent is hereby corrected as shown below:

In the Claims

In Column 8, Claim 2, Line 47, replace "cod gas" with the correct --cold gas--.

Signed and Sealed this
Second Day of April, 2024

Katherine Kelly Vidal
*Director of the United States Patent and Trademark Office*